United States Patent
Jones

(10) Patent No.: US 10,162,537 B2
(45) Date of Patent: Dec. 25, 2018

(54) METHODS AND SYSTEMS TO DETECT SILENT CORRUPTION OF DATA

(71) Applicant: Samsung Electronics Co., LTD., Gyeonggi-do (KR)

(72) Inventor: Justin Jones, Burlingame, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 33 days.

(21) Appl. No.: 14/850,680

(22) Filed: Sep. 10, 2015

(65) Prior Publication Data

US 2017/0075619 A1    Mar. 16, 2017

(51) Int. Cl.
*G06F 3/06* (2006.01)

(52) U.S. Cl.
CPC ............ *G06F 3/0619* (2013.01); *G06F 3/064* (2013.01); *G06F 3/0679* (2013.01)

(58) Field of Classification Search
CPC .... G06F 3/0619; G06F 3/0604; G06F 3/0638; G06F 3/0688; G06F 3/067
See application file for complete search history.

(56) References Cited

U.S. PATENT DOCUMENTS

| | | | | |
|---|---|---|---|---|
| 5,583,876 A | * | 12/1996 | Kakuta | G06F 11/1076 711/114 |
| 5,790,774 A | * | 8/1998 | Sarkozy | G06F 11/1076 714/6.12 |
| 8,495,454 B2 | | 7/2013 | Yang | |
| 2003/0014711 A1 | * | 1/2003 | Yuan | H03M 13/2975 714/786 |
| 2010/0241819 A1 | * | 9/2010 | Yoshii | G06F 12/0246 711/170 |
| 2010/0318887 A1 | * | 12/2010 | Zvibel | G06F 11/1004 714/819 |
| 2012/0066568 A1 | * | 3/2012 | Komagome | G06F 11/1016 714/764 |
| 2012/0198123 A1 | | 8/2012 | Post | |
| 2013/0067270 A1 | * | 3/2013 | Lee | G06F 11/1004 714/6.1 |
| 2013/0145085 A1 | * | 6/2013 | Yu | G06F 12/0246 711/103 |
| 2014/0244897 A1 | | 8/2014 | Goss et al. | |

FOREIGN PATENT DOCUMENTS

WO    2013109640 A1    7/2013

* cited by examiner

*Primary Examiner* — Larry T Mackall

(57) ABSTRACT

Encoded information, including first data and second data that was derived using the first data, is received. The second data can be used to determine the accuracy of the first data. The first data is stored in a first memory location that has a first address, and the second data is stored in a second memory location that has a second address. First information that is useful for determining the first address is stored, and second information that is useful for determining the second address is stored. Accessing the first data using the first information also causes the second data to be accessed using the second information.

19 Claims, 7 Drawing Sheets

METHODS AND SYSTEMS TO DETECT SILENT CORRUPTION OF DATA

BACKGROUND

A typical SSD (solid state drive, device, or disk) such as a flash memory type of SSD stores data in blocks. Each block contains some number of pages. An SSD is addressed linearly using logical block addresses (LBAs). A mapping table maps logical or virtual addresses to physical addresses. The mapping table effectively translates an address specified in a request for data into the correct physical location of the data on an SSD.

When an existing version of data stored in a block of an SSD is updated, the new (updated) version of the data is written to a different block, and the old (existing) version of the data is left unchanged in the first block. The mapping table is updated when the new version of the data is stored, so that the proper location of the current (most recent) version of the data can be correctly identified. The data in the first block will remain there until it is erased and/or replaced with other new data, which might not occur for some period of time.

Data integrity is maintained in SSDs using a variety of techniques. Error correction code (ECC) protects against read errors as a result of hardware errors. A cyclic redundancy check (CRC) ensures that the data that is returned when it is read from an SSD is the same as the data that was written to the SSD.

Other techniques attempt to ensure that the data is retrieved from the correct location and that the current version of the data is retrieved. That is, in the example above, techniques are employed to help ensure that the current version of the data is retrieved from the second block instead of the old version of the data in the first block. These techniques are effective for the most part but may not detect a type of data corruption known as "silent corruption." With silent corruption, a loss of data integrity may not be detected, and so the data may appear to be valid when actually it is not.

More specifically, there can be rare events—referred to as soft errors or single event upsets (SEUs)—that can prevent the mapping table from being properly updated when a new version of the data is stored. For example, an SEU can be the result of a cosmic event or cosmic ray that interrupts or perturbs the update process.

If the mapping table is not properly updated, it may point to a previous and now outdated version of a set of data by mistake, or it may point to a location that has been erased or that contains different data that is unrelated to the data previously stored at that location. Consequently, a request for a particular set of data will be mapped to an incorrect location, and the data at that location will be read and returned instead of the data that is actually wanted. Techniques like CRC will not detect that incorrect data is being returned, because the CRC will indicate that the returned data is correct but will fail to indicate that the returned data is not the data that is actually wanted. Thus, the user (e.g., host or application) will use the returned data, unaware that the data is not the wanted data. This is the type of data corruption referred to above as silent corruption.

Silent corruption can be detected, for example, by creating redundant sets (e.g., up to three sets) of the data of interest each time the data is updated. When the data is to be used, two sets of data can be read and compared; if they do not match, then the third set can be used to determine which of the other two sets is current. However, such an approach significantly increases the memory resources needed to store the data, and the extra reads and writes and the comparisons of sets of data increase the burden on processing resources and bandwidth, especially considering the large number of transactions and the very large data sets (sometimes known as "big data") that are becoming more commonplace as a byproduct of advances in data collection and storage.

SUMMARY

In an embodiment according to the present invention, encoded information, including first data and second data that was derived using the first data, is received. The first data is the data of interest (the data whose accuracy and integrity it is necessary to protect and maintain). The second data can be used to determine the accuracy or validity of the first data. The first data may hereinafter be referred to simply as "the data," and the second data may hereinafter be referred to as "the digest" to distinguish it from the data of interest. In an embodiment, the digest is a data integrity extension that is appended to the data and includes a guard value that can be used to verify the validity of the data.

The data is stored in a first memory location that has a first address, and the digest associated with that data is stored in a second memory location that has a second address. In an embodiment, the first memory location and the second memory location are on a single physical device (e.g., the same SSD). In another embodiment, the first memory location and the second memory location are on different physical devices (e.g., different SSDs). In the latter embodiment, the different physical devices may be components of the same computer system, or they may be components of different computer systems.

First information that is useful for determining the first address/memory location is generated and stored, and second information that is useful for determining the second address/memory location is generated and stored. In an embodiment, the first information includes a first entry in a mapping table, and the second information includes a second entry in the same mapping table. In another embodiment, the first information includes an entry in a first mapping table, and the second information includes an entry in a second mapping table. The first and second information can be generated using different operations and/or at different times to virtually eliminate the possibility that a single event upset or soft error would affect both pieces of information. In an embodiment, there is an established relationship between the first information and the second information, and accessing the data using the first information (e.g., the first entry) also causes the digest associated with that data to be accessed using the second information (e.g., the second entry).

Thus, the data and the digest associated with that data are stored in different physical memory locations (on the same storage device or on different storage devices), and the data and its digest are located using separate pieces of information (e.g., using an entry for the data in one mapping table and an entry for the digest in the same mapping table or in a different mapping table). As mentioned above, the information for locating the data and the information for locating the digest associated with that data can be generated (stored) separately, and so the probability that both pieces of information are affected by a single upset event or soft error is very small if not zero. Regardless, if one piece of information or the other is not correct (e.g., if one entry or the other is not properly added to a mapping table), silent corruption will be prevented. For example, if the map entry for the data is not updated but the map entry for the digest associated with that data is updated, then an outdated version of the data could be read, but the current version of the digest would be read. In that case, the data and its digest would not match and so the data would not be used.

Embodiments according to the present invention can thus be used, for example, to address the problem of silent corruption in devices such as, but not limited to, SSDs. By storing the data of interest and its digest separately, with separate location information (e.g., map entries) for each, embodiments according to the invention are efficiently and elegantly implemented without having to add extra storage devices and without substantially adding to the burden on existing memory, processing, and bandwidth resources. For example, embodiments according to the invention do not rely on storing and comparing multiple backup copies of the data or its digest to detect silent corruption. This, in turn, can reduce power consumption and operating costs.

These and other objects and advantages of the various embodiments of the present invention will be recognized by those of ordinary skill in the art after reading the following detailed description of the embodiments that are illustrated in the various drawing figures.

BRIEF DESCRIPTION OF DRAWINGS

The accompanying drawings, which are incorporated in and form a part of this specification and in which like numerals depict like elements, illustrate embodiments of the present disclosure and, together with the detailed description, serve to explain the principles of the disclosure.

DETAILED DESCRIPTION

Figure 1:
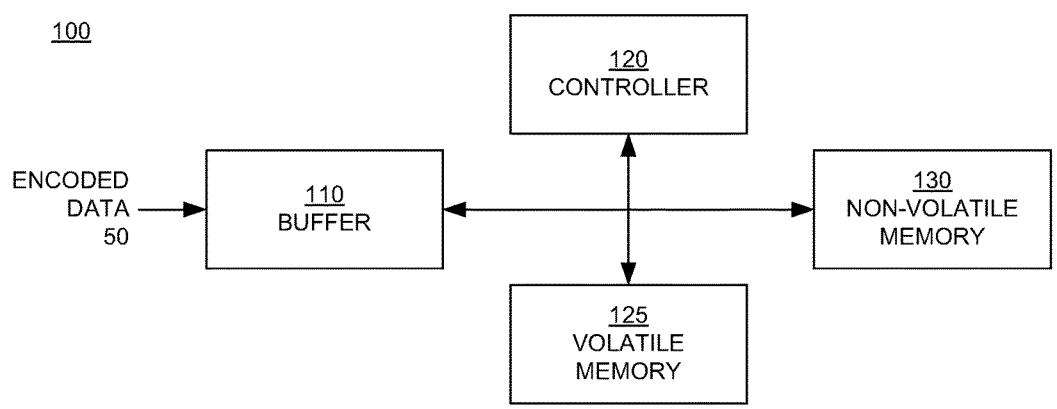
FIG. 1 is a block diagram of an example of a storage device upon which embodiments according to the present invention can be implemented.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "storing," "reading," "writing," "indexing," "mapping," "accessing," "using," "determining," "generating," or the like, refer to actions and processes (e.g., flowcharts 900 and 1000 of FIGS. 9 and 10, respectively) of an apparatus or computer system or similar electronic computing device or processor. A computer system or similar electronic computing device manipulates and transforms data represented as physical (electronic) quantities within memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a storage device 100 upon which embodiments according to the present invention can be implemented. In an embodiment, the storage device 100 is a solid state device, disk, or drive (SSD). In the example of FIG. 1, encoded data 50 is received by a buffer 110 from an interface with a host device (not shown). The host interface may be, for example, an NVMe (Non-Volatile Memory Express) interface. Alternatively, the host interface may be, for example, a serial or parallel ATA (Advanced Technology Attachment) interface, a PCI (Peripheral Component Interconnect) Express interface (PCIe), or a serial or parallel SCSI (Small Computer System Interface) interface. However, the invention is not limited to these examples.

In the FIG. 1 embodiment, the volatile memory 125 can be used to store mapping tables that map virtual or logical addresses used by the host to physical addresses on the storage device 100, specifically addresses for physical locations in the non-volatile memory 130. In an embodiment, the non-volatile memory 130 is implemented as NAND-based flash memory, although it can instead be implemented as NOR-based flash memory or other non-volatile mediums. In general, non-volatile memory 130 stores data persistently.

Figure 9:
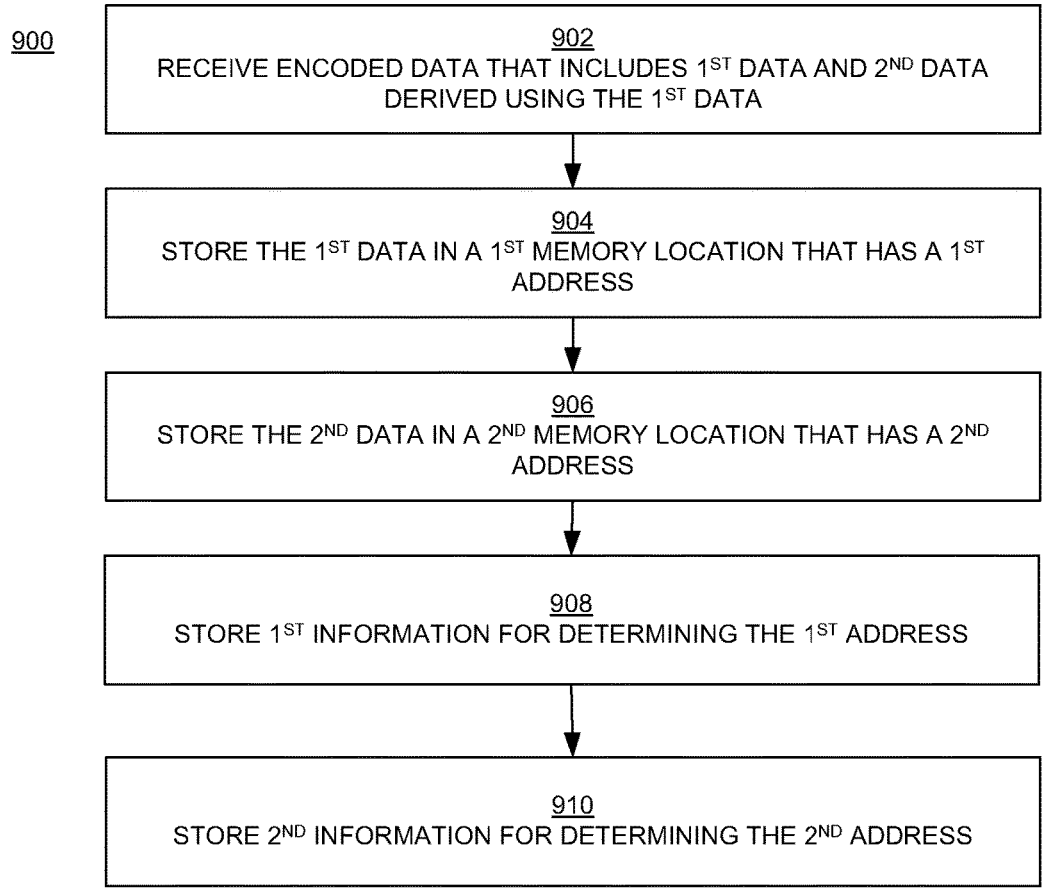
FIGS. 9 and 10 are flowcharts of examples of computer-implemented methods for storing and accessing data in embodiments according to the present invention.
Figure 10:
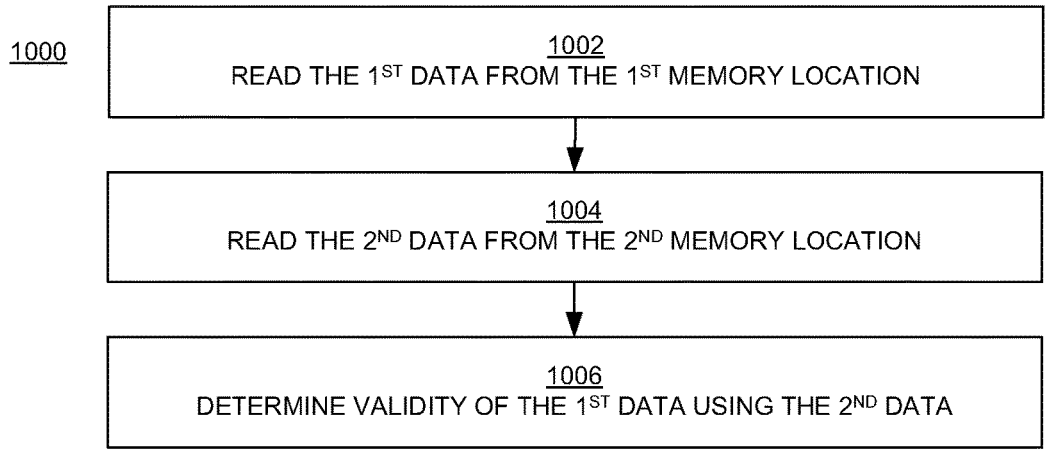

The controller 120 broadly includes any processing device capable of executing computer-readable instructions, such as instructions associated with the operations described in conjunction with FIGS. 9 and 10. The controller 120 may be, for example, a reduced instruction set processor implemented as an ASIC (application-specific integrated circuit). The controller 120 executes code (e.g., firmware) to perform diagnostic, caching, and security functions, address the non-volatile memory 130, manage the mapping tables, and perform other functions either described below or known in the art. In an embodiment, the controller 120 is an NVMe controller.

The storage device 100 of FIG. 1 can include other elements beyond those shown and described, and the elements just described may perform other functions in addition to those described herein.

Figure 2:
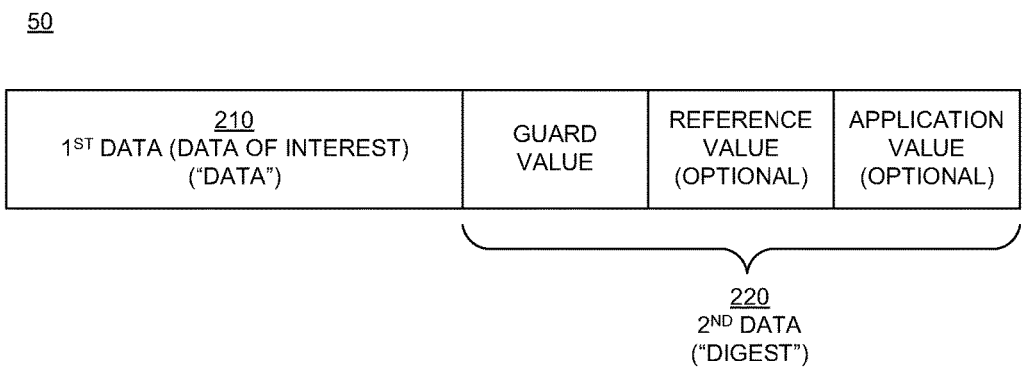
FIG. 2 is an example of encoded data that is received by a storage device in an embodiment according to the invention.

FIG. 2 is an example of encoded data 50 that is received by the storage device 100 of FIG. 1 in an embodiment according to the invention. The data 50 includes first data 210 (the data of interest that is to be stored; the data whose accuracy and integrity is to be protected and maintained). In an embodiment, the data 210 includes up to 512 bytes of information; however, the invention is not so limited. Many different sizes of data are supported, including but not limited to 4096 and 8192 bytes of information, for example.

The data 50 also includes second data 220, which may be referred to as a digest or as protection information. The digest 220 is derived from or using the data 210 and can be used to check the validity of the data 210. The digest 220 is concatenated with or appended to the data 210. In an embodiment, the digest 220 includes up to eight bytes of information.

In an embodiment, the digest 220 includes a guard value that may be up to two bytes in length. As mentioned above, the guard value is derived from or using the data 210 and can be used to determine the validity of that data. For example, the guard value may be a cyclic redundancy check (CRC) value or a checksum. In an embodiment, the digest 220 is a Data Integrity Extension (DIX); in such an embodiment, the digest includes other information such as a four-byte reference value and a two-byte application value.

Figure 3:
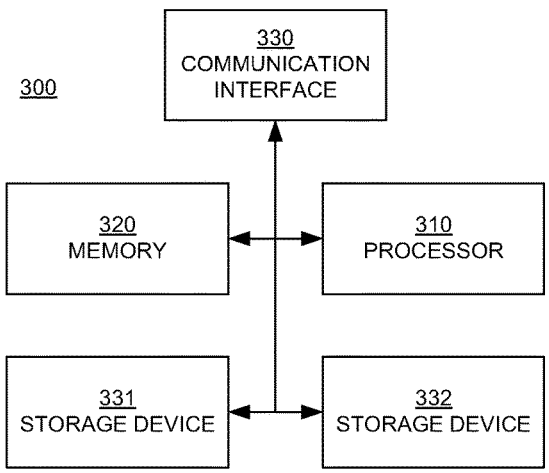
FIG. 3 is a block diagram of an apparatus upon which embodiments according to the present invention can be implemented.

FIG. 3 is a block diagram of an apparatus or computer system 300 upon which embodiments according to the present invention can be implemented. The computer system 300 broadly includes any single or multi-processor computing device or system capable of executing computer-readable instructions, such as instructions associated with the operations described in conjunction with FIGS. 9 and 10. In its most basic configuration, the computer system 300 may include at least one processing circuit (e.g., the processor 310) and at least one memory (e.g., the memory 320).

The processor 310 of FIG. 3 generally represents any type or form of processing unit or circuit capable of processing data or interpreting and executing instructions. The memory 320 generally represents any type or form of volatile or non-volatile storage device or medium capable of storing data and/or other computer-readable instructions. Examples of the memory 320 include, without limitation, RAM, ROM, flash memory, or any other suitable memory device.

The computer system 300 may also include components or elements in addition to the processor 310 and the system memory 320. For example, the computer system 300 may include an input/output (I/O) device (not shown) and a communication interface 330. The communication interface 330 broadly represents any type or form of wired or wireless communication device or adapter capable of facilitating communication between the computer system 300 and one or more other devices over a network such as the Internet.

In the example of FIG. 3, the computer system 300 includes at least two storage devices 331 and 332. In an embodiment, the storage devices 331 and 332 are SSDs such as the storage device 100 of FIG. 1.

Figure 4:
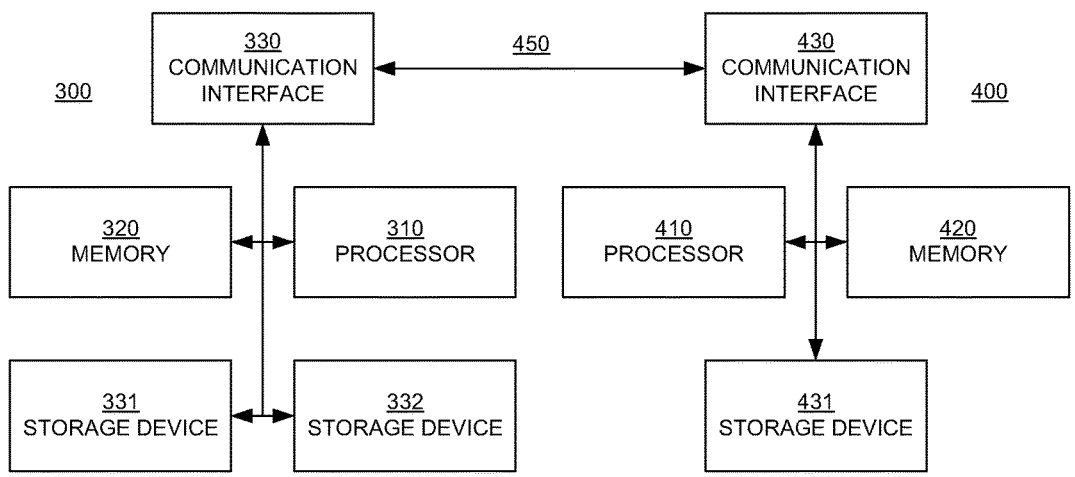
FIG. 4 is a block diagram of a system or network upon which embodiments according to the present invention can be implemented.

FIG. 4 is a block diagram of a system or network 450 of apparatuses (computer systems) upon which embodiments according to the present invention can be implemented. In the example of FIG. 4, the network 450 includes the computer system 300 and another computer system 400. The network 450 generally represents any wired (including optical fiber) or wireless telecommunication or computer network including but not limited to, for example, an intranet, a wide area network (WAN), a local area network (LAN), a personal area network (PAN), a storage area network (SAN), a network of PCIe switches and devices, or the Internet. The network 450 can include additional computer systems as well as other types of devices such as routers and switches.

In its most basic configuration, the computer system 400 may include at least one processing circuit (e.g., the processor 410), at least one memory (e.g., the memory 420), and a communication interface 430, which are analogous to the corresponding elements in the computer system 300 that are described above. The computer system 400 may also include components or elements in addition to those shown and described. In the example of FIG. 4, the computer system 400 includes at least one storage device 431. In an embodiment, the storage device 431 is an SSD such as the storage device 100 of FIG. 1.

The network 450 can include or be part of a distributed or shared storage system (e.g., a network-attached storage (NAS) system or cluster) that includes a number of NAS devices (e.g., the computer systems 300 and 400 or the storage devices 331, 332, and 431) that provide file-based data storage services to other devices (clients, such as application servers) in the network. Those storage services may include the storage, management, and maintenance of very large data sets commonly referred to as "big data."

For example, the network 450 can include or be part of an online transaction processing (OLTP) system that, in general, stores and maintains a database of transactional data, in which case the data 210 of FIG. 2 may be transaction-related data used by banks, airlines, insurers, health providers, and retailers, for example. A database management system (DBMS) or a distributed DBMS (DDBMS) can partition the database across a cluster of computer systems (e.g., the computer systems 300 and 400) or storage devices (e.g., the storage devices 331, 332, and 431) in the OLTP system.

In general, in embodiments according to the present invention, the data 210 (FIG. 2) is stored in a first memory location that has a first address, and the digest 220 is stored in a second memory location that has a second address. In an embodiment, the first memory location and the second memory location are on a single physical device (e.g., the same SSD). In another embodiment, the first memory location and the second memory location are on different physical devices (e.g., different SSDs). In the latter embodiment, the different physical devices may be components of the same apparatus or computer system, or they may be components of different apparatuses or computer systems.

Figure 5:
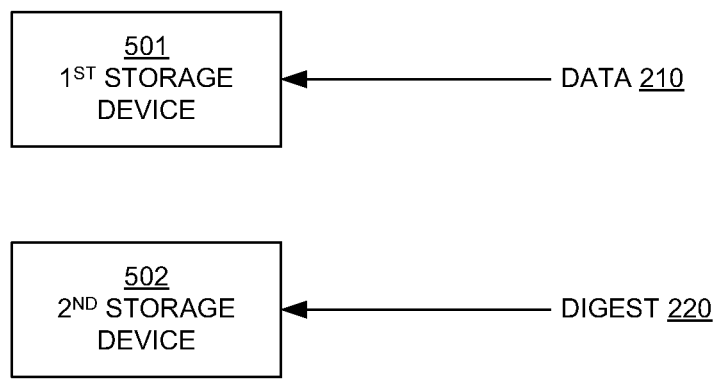
FIG. 5 is a block diagram illustrating an example of an approach for storing data in an embodiment according to the present invention.

FIG. 5 is a block diagram illustrating an example of an approach for storing the data 210 and the digest 220 in an embodiment according to the present invention. As mentioned above, the data 210 is the data to be protected and maintained, and a digest 220 is associated with the data 210.

In the example of FIG. 5, the first and second memory locations are on different physical storage devices; the data 210 is stored in a first storage device 501 and the digest 220 is stored in a second storage device 502. The first and second storage devices 501 and 502 may be on the same apparatus or computer system or on different apparatuses or computer systems. In the FIG. 5 example, the first storage device 501 may be the storage device 331 and the second storage device 502 may be the storage device 332 of FIG. 3, or the first storage device 501 may be the storage device 331 and the second storage device 502 may be the storage device 431 of FIG. 4.

Figure 6:
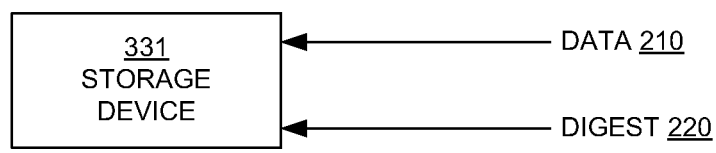
FIG. 6 is a block diagram illustrating an example of another approach for storing data in an embodiment according to the present invention.

FIG. 6 is a block diagram illustrating an example of another approach for storing the data 210 and the digest 220 (FIG. 2) in an embodiment according to the present invention. In the example of FIG. 6, the first and second memory locations are on the same physical storage device (e.g., the storage device 331). That is, in this example, the data 210 and the digest 220 are stored on the same storage device. In an embodiment, the data 210 and the digest 220 are stored in adjacent locations on the storage device.

In general, in embodiments according to the present invention, first information that is useful for determining the first memory location (for determining a first address for the first memory location) is generated and stored, and second information that is useful for determining the second memory location (for determining a second address for the second memory location) is generated and stored. In an embodiment, the first information includes a first entry in a mapping table, and the second information includes a second entry in the same mapping table. In another embodiment, the first information includes an entry in a first mapping table, and the second information includes an entry in a second mapping table.

The first information and the second information (e.g., entries in a mapping table or tables) may reside on and be managed by the storage device itself (e.g., the storage device 100 of FIG. 1) or by an apparatus that includes the storage device (e.g., the computer system 300 or 400 of FIGS. 3 and 4).

Figure 7A:
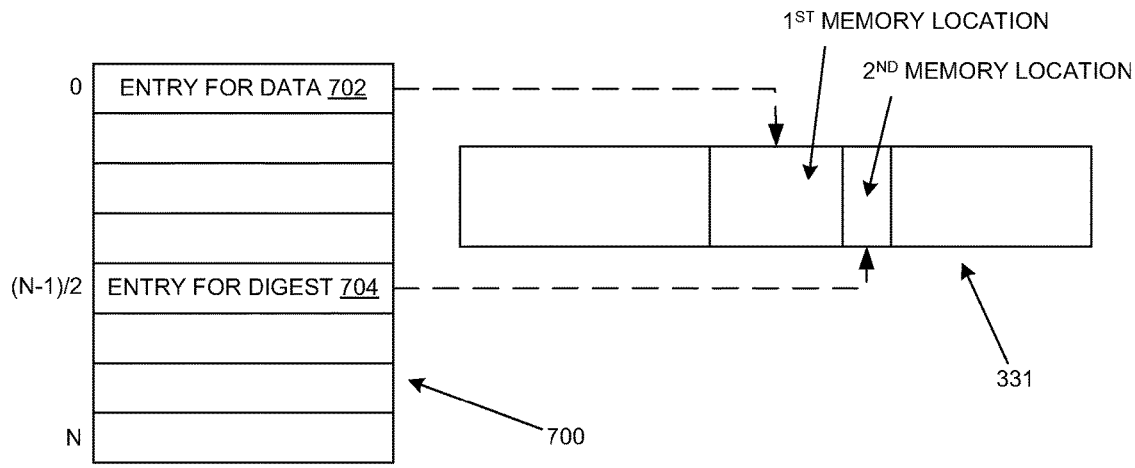
FIGS. 7A and 7B illustrate examples of the use of a mapping table in an embodiment according to the present invention.
Figure 7B:
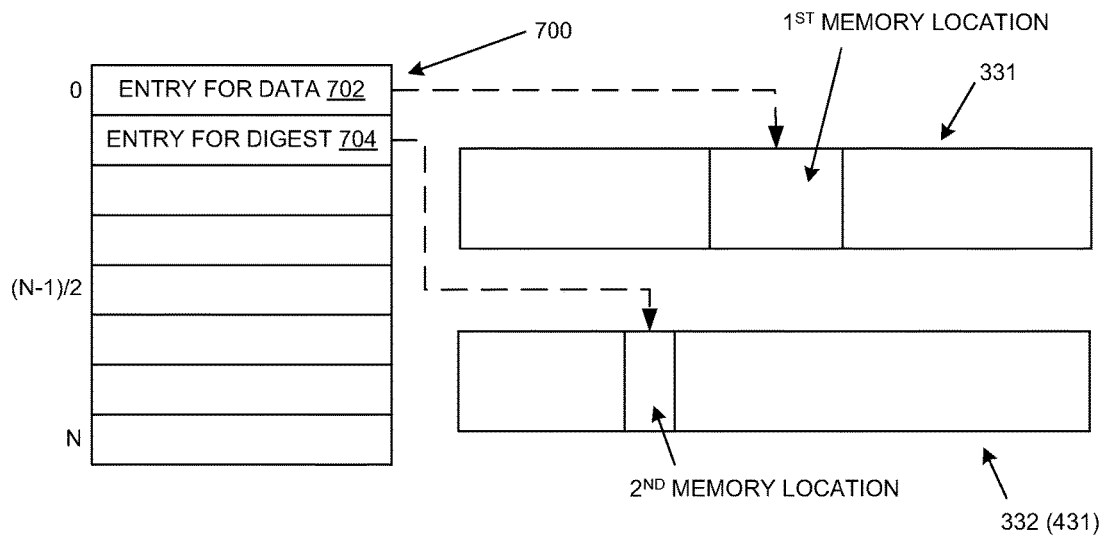

FIGS. 7A and 7B illustrate examples of the use of a mapping table 700 in an embodiment according to the present invention. The mapping table 700 includes some number N of entries that map logical or virtual addresses to physical addresses in a storage device or storage devices. In the example of FIG. 7A, the data 210 and the digest 220 are shown as being stored in the same storage device (e.g., the storage device 331). However, as described above, the data 210 and the digest 220 can be stored on different storage devices as shown in FIG. 7B, in which case the second storage device (e.g., the storage device 332) may be on the same computer system as the storage device 331 as shown in the example of FIG. 3, or the second storage device (e.g., the storage device 431) may be on a different computer system as shown in the example of FIG. 4.

In embodiments according to the invention, the mapping table 700 includes a first entry 702 for the data 210 and a second entry 704 for the digest 220 (here, the terms "first" and "second" are used as descriptors for the two entries and do not necessarily indicate that the entries are the actual first and second entries in the mapping table). Thus, in the examples of FIGS. 7A and 7B, the entries for the data 210 and the digest 220 are in the same mapping table, but at different locations in the mapping table.

In an embodiment, there is a fixed or established relationship between the location of the first entry 702 in the mapping table 700 and the location of the second entry 704 in the mapping table. For example, as shown in FIG. 7A, if the first entry 702 is the first actual entry in the top half of the mapping table 700, then the second entry 704 can be the first actual entry in the bottom half of the mapping table. Alternatively, the entry for the digest 220 can follow (be adjacent to) the entry for the data 210 as shown in FIG. 7B. Other relationships between the two entries are possible. In an embodiment, accessing the data 210 using the first entry 702 automatically causes the digest 220 to also be accessed using the second entry 704. For example, the controller 120 of FIG. 1 (or the processor 310 of FIG. 3 or the processor 410 of FIG. 4) can fetch both the data of interest (the data 210) and the digest corresponding to that data (the digest 220) by using the first entry 702 to find the address for the data and using the fixed relationship between the first entry 702 and the second entry 704 to find the second entry and hence the address for the digest.

Figure 8A:
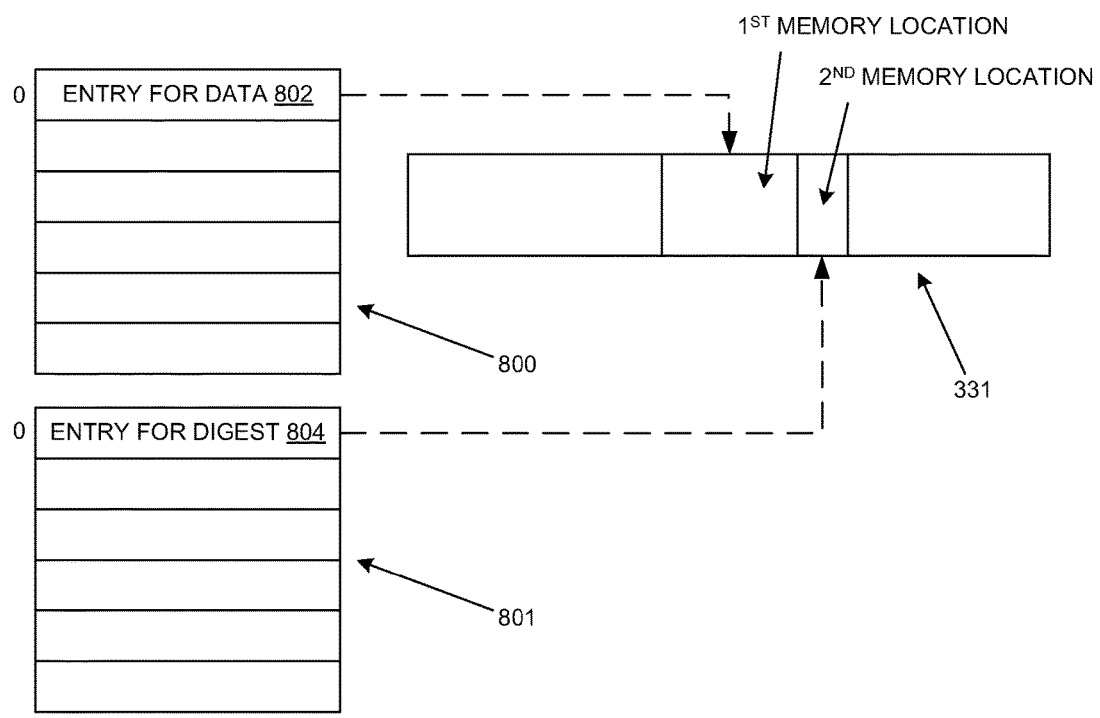
FIGS. 8A and 8B illustrate examples of the use of two mapping tables in an embodiment according to the present invention.
Figure 8B:
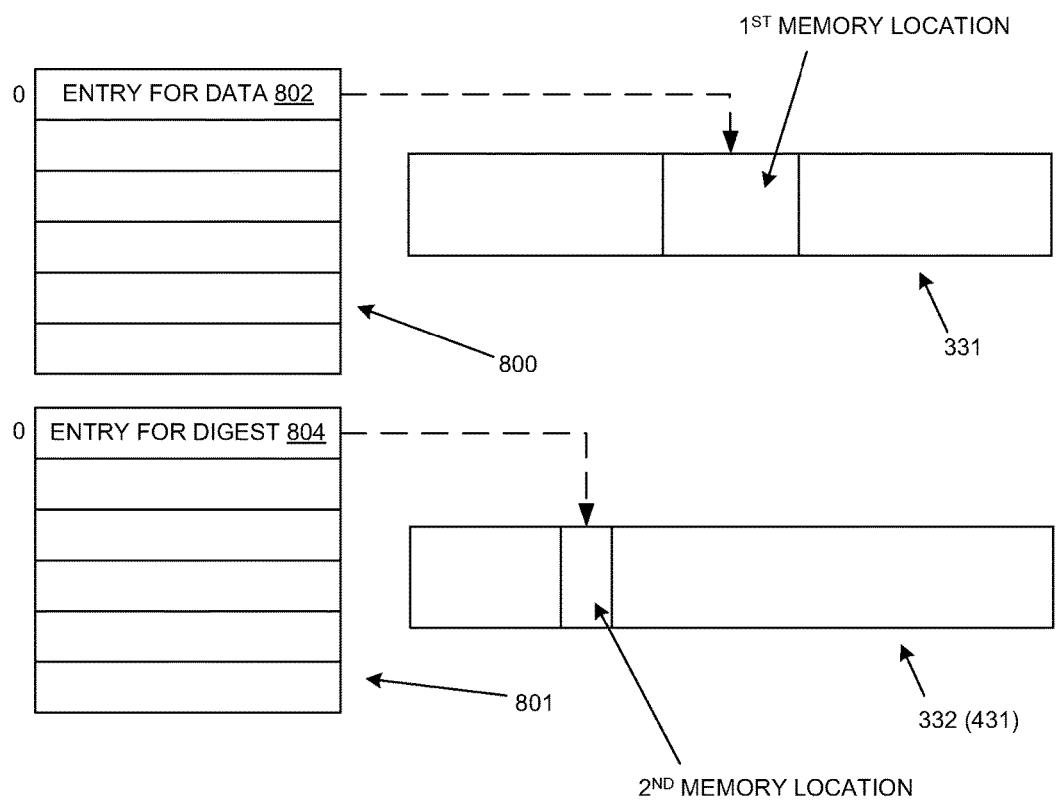

FIGS. 8A and 8B illustrate examples of the use of two mapping tables 800 and 801 in an embodiment according to the present invention. Each of the mapping tables 800 and 801 includes some number of entries that map logical or virtual addresses to physical addresses in a storage device or storage devices. In the example of FIG. 8A, the data 210 and the digest 220 are shown as being stored in the same storage device (e.g., the storage device 331). However, as described above, the data 210 and the digest 220 can be stored on different storage devices as shown in FIG. 8B, in which case the second storage device (e.g., the storage device 332) may be on the same computer system as the storage device 331 as shown in the example of FIG. 3, or the second storage device (e.g., the storage device 431) may be on a different computer system as shown in the example of FIG. 4.

In embodiments according to the invention, the mapping table 800 includes an entry 802 for the data 210, and the mapping table 801 includes an entry 804 for the digest 220. That is, the entries for the data 210 and the digest 220 are in different mapping tables. In an embodiment, there is a fixed or established relationship between the location of the entry 802 in the mapping table 800 and the location of the entry 804 in the mapping table 801 as described above. For example, as shown in FIGS. 8A and 8B, if the entry 802 is the first actual entry in the mapping table 800, then the entry 804 can be the first actual entry in the mapping table 801. Other relationships between the two entries are possible. In an embodiment, accessing the data 210 using the first entry 802 automatically causes the digest 220 to also be accessed using the second entry 804 as described above.

In the examples of FIGS. 7A, 7B, 8A, and 8B, the mapping table entries 702 and 704 or 802 and 804 for the data 210 and the digest 220 can be generated using different operations and/or at different times to virtually eliminate the possibility that a single event upset or soft error would affect both entries.

FIGS. 9 and 10 are flowcharts 900 and 1000, respectively, of examples of computer-implemented methods for storing and accessing data in embodiments according to the present invention. The flowcharts 900 and 1000 can be implemented as computer-executable instructions residing on some form of non-transitory computer-readable storage medium and executed in an apparatus or computer system using a processing device or circuit such as the controller 120, the processor 310, or the processor 410 of FIGS. 1, 3, and 4, respectively.

In block 902 of FIG. 9, with reference also to FIG. 2, encoded information that includes first data (the data 210) and second data that was derived using the first data (the digest 220) is received.

In block 904 of FIG. 9, the first data is stored in a first memory location that has a first address.

In block 906, the second data is stored in a second memory location that has a second address.

As presented above, the first memory location and the second memory location may be on a single physical device (as in the examples of FIGS. 6, 7A, and 8A), or the first memory location and the second memory location may be on a first physical device and a second physical device, respectively (as in the example of FIGS. 5, 7B, and 8B). In the latter case, the first and second physical devices may be components of a same computer system (as in the example of FIG. 3), or the first physical device may be a component of a first computer system and the second physical device may be a component of a second computer system, and the first and second computer systems may be components of a network (as in the example of FIG. 4).

In block 908 of FIG. 9, first information that is useful for determining the first address is stored.

In block 910, second information that is useful for determining the second address is stored. In an embodiment, accessing the first data using the first information also causes accessing the second data using the second information.

As presented above, in an embodiment, the first information is or includes a first entry in a mapping table, and the second information is or includes a second entry in the same mapping table (as in the examples of FIGS. 7A and 7B), or the first information is or includes an entry in a first mapping table and the second information is or includes an entry in a second mapping table (as in the examples of FIGS. 8A and 8B). In such an embodiment, the mapping table or tables is/are updated to include the first and second information (entries) from blocks 908 and 910.

In block 1002 of FIG. 10, the first data (the data 210 of FIG. 2) is read from the first memory location.

In block 1004 of FIG. 10, the second data (the digest 220 of FIG. 2) is read from the second memory location. As mentioned above, in an embodiment, the first memory location and the second memory location are identified by separate entries in a mapping table or by entries in separate mapping tables, where the entries are related in some way. Hence, in such an embodiment, reading the first data (using the first entry) automatically causes reading the second data (using the second entry).

In block 1006 of FIG. 10, the validity of the first data is determined using the second data. The validity check of block 1006 can be performed by the storage device, by a computer system that hosts the storage device, or by an application that requested the data, for example.

In summary, embodiments according to the present invention can be used, for example, to address the problem of silent corruption in devices such as, but not limited to, SSDs. As a result, data storage devices and systems are more reliable, and the overall trustworthiness of the stored data is increased. By storing the data of interest and the digest for that data separately, with separate map entries for each, embodiments according to the invention are efficiently and elegantly implemented without having to add extra storage devices and without substantially adding to the burden on existing memory or processing resources or bandwidth. For example, embodiments according to the invention do not rely on storing, retrieving, and comparing backup copies of the data to detect silent corruption.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the subject matter has been described in language specific to structural features and/or methodological acts, it is to be understood that the subject matter defined in the disclosure is not necessarily limited to the specific features or acts described above. Rather, the specific features and acts described above are disclosed as example forms of implementing the disclosure.

Embodiments according to the invention are thus described. While the present disclosure has been described in particular embodiments, it should be appreciated that the invention should not be construed as limited by such embodiments, but rather construed according to the following claims.

What is claimed is:

1. A method, comprising:
   receiving encoded information comprising first data and second data that was derived using the first data, wherein the second data is for determining accuracy of the first data, and wherein the second data is concatenated with the first data;
   storing the first data but not the second data in a first memory location that has a first address associated therewith;
   storing the second data but not the first data in a second memory location that has a second address associated therewith, wherein the second address is different from the first address;
   storing first information that is useful for determining the first address;
   storing second information that is useful for determining the second address, wherein said storing the first information and said storing the second information are performed at different times, wherein the second information is different from the first information, and wherein accessing the first data using the first information also causes accessing the second data using the second information;
   accessing the first data and the second data;
   updating the second mapping table entry to include a current version for the second data but not updating the first mapping table entry to include a version of the first data; and
   using the second data to determine the accuracy of the first data based on whether the current version of the second data matches the first data.

2. The method of claim 1, wherein the first memory location and the second memory location are on a single physical device.

3. The method of claim 1, wherein the first memory location and the second memory location are on a first physical device and a second physical device, respectively.

4. The method of claim 3, wherein the first and second physical devices are components of a same computer system.

5. The method of claim 3, wherein the first physical device is a component of a first computer system and the second physical device is a component of a second computer system that are components of a network.

6. The method of claim 1, wherein the first information comprises a first entry in a mapping table, wherein the first entry maps a first logical address to a first physical address, wherein the second information comprises a second entry in the mapping table, wherein the second entry maps a second logical address to a second physical address, and wherein there is a fixed relationship between the first entry in the mapping table and the second entry in the mapping table and the fixed relationship is used to find the second entry based on the first entry.

7. The method of claim 1, wherein the first information comprises an entry in a first mapping table, wherein the first entry maps a first logical address to a first physical address, wherein the second information comprises an entry in a second mapping table, wherein the second entry maps a second logical address to a second physical address, the second mapping table different from the first mapping table, and wherein there is a fixed relationship between the first entry in the first mapping table and the second entry in the second mapping table and the fixed relationship is used to find the second entry based on the first entry.

8. An apparatus, comprising:
   a processor; and
   memory coupled to the processor and that stores instructions for execution by the processor, the instructions when executed causing the processor to receive encoded information comprising first data and second data that was derived using the first data, wherein the second data is concatenated with the first data; direct the first data but not the second data to a first memory location that has a first physical address; and direct the second data but not the first data to a second memory location that has a second physical address that is different from the first physical address;
   wherein the first memory location is accessible using a first mapping table entry that maps a first logical address to the first physical address and wherein the second memory location is accessible using a second mapping table entry that maps a second logical address to the second physical address, wherein the second mapping table entry is different from the first mapping table entry and wherein the first mapping table entry and the second mapping table entry are generated at different times, wherein there is a fixed relationship between a location of the first mapping table entry in a mapping table and a location of the second mapping table entry in a mapping table and the fixed relationship is used to find the location of the second mapping table entry based on the location of the first mapping table entry so that a request to read the first data from the first memory location causes the second data to be read from the second memory location, wherein the second mapping table entry is updated to include a current version for the second data but not the first mapping table entry to include a version of the first data, and wherein accuracy of the first data is verifiable using the second data based on whether the current version of the second data matches the first data.

9. The apparatus of claim 8, coupled to a storage device, wherein the first memory location and the second memory location are on the storage device.

10. The apparatus of claim 9, wherein the storage device comprises a flash memory device comprising an NVMe (non-volatile memory express) controller, and wherein the second data comprises a data integrity extension concatenated with the first data and comprising a guard value.

11. The apparatus of claim 8, coupled to a first storage device and coupled to a second storage device, wherein the first memory location is on the first storage device and the second memory location is on the second storage device.

12. The apparatus of claim 8, wherein the first mapping table entry and the second mapping table entry are in a same mapping table that maps logical addresses to physical addresses.

13. The apparatus of claim 8, wherein the first mapping table entry is in a first mapping table that maps logical addresses to physical addresses and the second mapping table entry is in a second mapping table that maps logical addresses to physical addresses, wherein the second mapping table is different from the first mapping table.

14. A method, comprising:
reading data from a first memory location having a first address, the first memory location indexed by a first mapping table entry that maps a first logical address to a first physical address;
using the first mapping table entry to determine a second mapping table entry based on a fixed relationship between the first mapping table entry and the second mapping table entry, wherein the second mapping table entry maps a second logical address to a second physical address, wherein the second mapping table entry is different from the first mapping table entry, and wherein the first mapping table entry and the second mapping table entry are generated at different times;
reading a digest from a second memory location having a second address, the second memory location indexed by the second mapping table entry;
updating the second mapping table entry to include a current version for the digest but not updating the first mapping table entry for a version of the data; and
determining the validity of the data using the digest based on whether the current version of the digest matches the data.

15. The method of claim 14, wherein the first memory location and the second memory location are on the same device.

16. The method of claim 14, wherein the first memory location and the second memory location are on a first physical device and a second physical device, respectively.

17. The method of claim 16, wherein the first physical device and the second physical device are components of a first computer system and a second computer system, respectively, the first and second computer systems communicatively coupled in a network.

18. The method of claim 14, wherein the first mapping table entry and the second mapping table entry are in the same mapping table.

19. The method of claim 14, wherein the first mapping table entry and the second mapping entry are in different mapping tables.

* * * * *